(12) United States Patent
Wheeler

(10) Patent No.: US 9,416,878 B1
(45) Date of Patent: Aug. 16, 2016

(54) VALVE INCLUDING A SHAPE MEMORY ALLOY MEMBER

(71) Applicant: Kongsberg Automotive, Inc., Novi, MI (US)

(72) Inventor: Doug Wheeler, Farmington Hills, MI (US)

(73) Assignee: KONGSBERG AUTOMOTIVE, INC., Novi, MI (US)

( * ) Notice: Subject to any disclaimer, the term of this patent is extended or adjusted under 35 U.S.C. 154(b) by 25 days.

(21) Appl. No.: 14/623,194

(22) Filed: Feb. 16, 2015

(51) Int. Cl.
*F16K 31/02* (2006.01)
*F16K 1/16* (2006.01)
*F16K 25/00* (2006.01)

(52) U.S. Cl.
CPC .............. *F16K 1/16* (2013.01); *F16K 25/005* (2013.01); *F16K 31/02* (2013.01)

(58) Field of Classification Search
CPC ....... F16K 1/16; F16K 31/004; F16K 31/005; F16K 31/006; F16K 31/02; F16K 99/0042; F16K 25/005; F02M 2200/21; F02M 2200/22; Y10T 137/2192
USPC ........................................ 251/129.01, 129.06
See application file for complete search history.

(56) References Cited

U.S. PATENT DOCUMENTS

| | | | |
|---|---|---|---|
| 4,429,552 A | 2/1984 | Reedy | |
| 5,669,416 A * | 9/1997 | Nusche | F15C 3/08 137/625.44 |
| 5,787,947 A | 8/1998 | Hertsgaard | |
| 6,024,545 A | 2/2000 | Morioka | |
| 6,449,434 B1 | 9/2002 | Fuss | |
| 6,464,200 B1 | 10/2002 | Hines et al. | |
| 7,363,942 B2 * | 4/2008 | Fernandez | F16K 11/072 137/625 |
| 7,663,811 B2 | 2/2010 | Noda et al. | |

(Continued)

FOREIGN PATENT DOCUMENTS

| | | |
|---|---|---|
| JP | 2006 037786 A | 2/2006 |
| WO | WO 2007 030417 A2 | 3/2007 |

OTHER PUBLICATIONS

V. Shkolnikov, J. Ramunas, J.G. Santiago, "A self-priming, roller-free, miniature, peristaltic pump operable with a single, reciprocating actuator", Sens Actuators A Phys., May 2010, 160(1-2), 141-146, Elsevier B.V.; 16 pages.

(Continued)

*Primary Examiner* — Kevin Murphy
*Assistant Examiner* — Ian Paquette
(74) *Attorney, Agent, or Firm* — Howard & Howard Attorneys PLLC

(57) ABSTRACT

A valve selectively opens and closes a passageway defined by a port. The valve comprises a body defining outer and inner surfaces; the inner surface defining an inner cavity. A sealing arm extends from the body into the inner cavity and is movable between first and second positions for closing and opening the passageway, respectively. A shape memory alloy member is disposed at least partially along the outer surface and alternates between first and second lengths in de-energized and energized states, respectively. The first length is greater than the second length, which constricts about the body. A leg extends from the body into the inner cavity and is moveable between initial and activated positions in the de-energized and energized states, respectively. The leg engages and moves the sealing arm from the first position to the second position when the leg moves from the initial position to the activated position.

22 Claims, 8 Drawing Sheets

(56) References Cited

U.S. PATENT DOCUMENTS

| | | | |
|---|---|---|---|
| 8,127,543 B2 | 3/2012 | Von Behrens et al. | |
| 8,382,460 B2 | 2/2013 | Ramunas et al. | |
| 8,570,384 B2 | 10/2013 | Brown | |
| 2001/0011414 A1 | 8/2001 | Antonio et al. | |
| 2005/0121636 A1 | 6/2005 | Scott | |
| 2007/0023089 A1 | 2/2007 | Beyerlein et al. | |
| 2008/0018198 A1* | 1/2008 | Sohn | F03G 1/00 310/307 |
| 2010/0111733 A1* | 5/2010 | Ramunas | F04B 43/123 417/474 |
| 2011/0039967 A1* | 2/2011 | Wilson | B82Y 30/00 521/164 |
| 2011/0166524 A1* | 7/2011 | Preuthun | A61M 5/14224 604/151 |
| 2012/0011843 A1 | 1/2012 | Makinson et al. | |
| 2012/0067430 A1 | 3/2012 | Deperraz et al. | |
| 2012/0153043 A1 | 6/2012 | Arekar et al. | |
| 2013/0002933 A1 | 1/2013 | Topliss et al. | |
| 2013/0162896 A1 | 6/2013 | Kang et al. | |
| 2013/0277580 A1 | 10/2013 | Deperraz | |
| 2014/0060858 A1 | 3/2014 | Johnson | |
| 2014/0125042 A1 | 5/2014 | Köpfer et al. | |

OTHER PUBLICATIONS

Web page http://www.takasago-fluidics.com/products_valve/others/SMV/, Shape Memory Alloy Valve SMV Series, Jul. 9, 2014; 2 pages.

Machine-assisted English language translation of Application No. JP 2006 037786 extracted from www4.j-platpat.inpit.go.jp on Jul. 30, 2015; 16 pages.

* cited by examiner

VALVE INCLUDING A SHAPE MEMORY ALLOY MEMBER

BACKGROUND OF THE INVENTION

1. Field of the Invention

The subject invention relates to a valve for selectively permitting the flow of a fluid.

2. Description of Related Art

There is a desire within industries implementing fluid transportation to provide for a fluid routing device which can alter the flow path of a fluid. A popular method of altering the flow path of a fluid is through a valve. The valve selectively opens and closes a port to selectively permit the flow of the fluid therethrough. Many techniques have been used to alternate the valve for selectively opening and closing the port. One solution in the industry involves a shape memory alloy wire for selectively fluidly opening and closing the port. The valve includes a housing and a plunger that is biased along an axis toward the port for closing the port. The valve also includes the shape memory alloy wire. The wire linearly extends along the axis and is coupled to the plunger and the housing. When an electrical current passes through the shape memory alloy wire, the wire contracts along the axis and pulls the plunger away from the port, against the bias, to open the port.

Although effective, the linear actuation of the plunger by the shape memory alloy wire along the axis requires contraction and expansion of the shape memory alloy member sufficient to move the plunger to open and close the port. As such, the shape memory alloy wire must extend a sufficient length along the axis to facilitate enough movement of the plunger to open and close the port, which in-turn increases the size of the valve. As such, there remains a need to provide an improved valve.

SUMMARY OF THE INVENTION AND ADVANTAGES

The subject invention provides for a valve for selectively opening and closing a passageway defined by a port and selectively permitting the flow of a fluid therethrough. The valve comprises a body defining an outer surface and an inner surface with the inner surface defining an inner cavity. The valve further comprises a sealing arm mounted to and extending from the body into the inner cavity. The sealing arm is movable relative to the body between a first position for closing the passageway defined by the port, and a second position for opening the passageway defined by the port. The valve further comprises a shape memory alloy member mounted to the body and disposed at least partially along the outer surface. The shape memory alloy member alternates between a first length when the shape memory alloy member is in a de-energized state and a second length when the shape memory alloy member is in an energized state. The first length is greater than the second length such that the shape memory alloy member constricts about the body when the shape memory alloy member is the second length. The valve further comprises a leg mounted to and extending from the body into the inner cavity. The leg is moveable between an initial position when the shape memory alloy member is in the de-energized state and an activated position when the shape memory alloy member is in the energized state. The leg correspondingly engages and moves the sealing arm from the first position to the second position when the leg moves from the initial position to the activated position for opening the passageway defined by the port.

Accordingly, the extension of the sealing arm and the leg into the inner cavity of the body creates a compact configuration. The compact configuration provides versatility to the valve, allowing the valve to be packaged in voids which are relatively small, and correspondingly improves the packaging of other components around the valve. Furthermore, the configuration of the shape memory alloy member at least partially along the outer surface of the body and constricting the body allows for minimal change between the first and second lengths to be mechanically advantaged by the leg creating sufficient movement of the sealing arm between the first and second positions for opening and closing the passageway.

BRIEF DESCRIPTION OF THE DRAWINGS

Advantages of the subject invention will be readily appreciated as the same becomes better understood by reference to the following detailed description when considered in connection with the accompanying drawings.

DETAILED DESCRIPTION OF THE INVENTION

Figure 1:
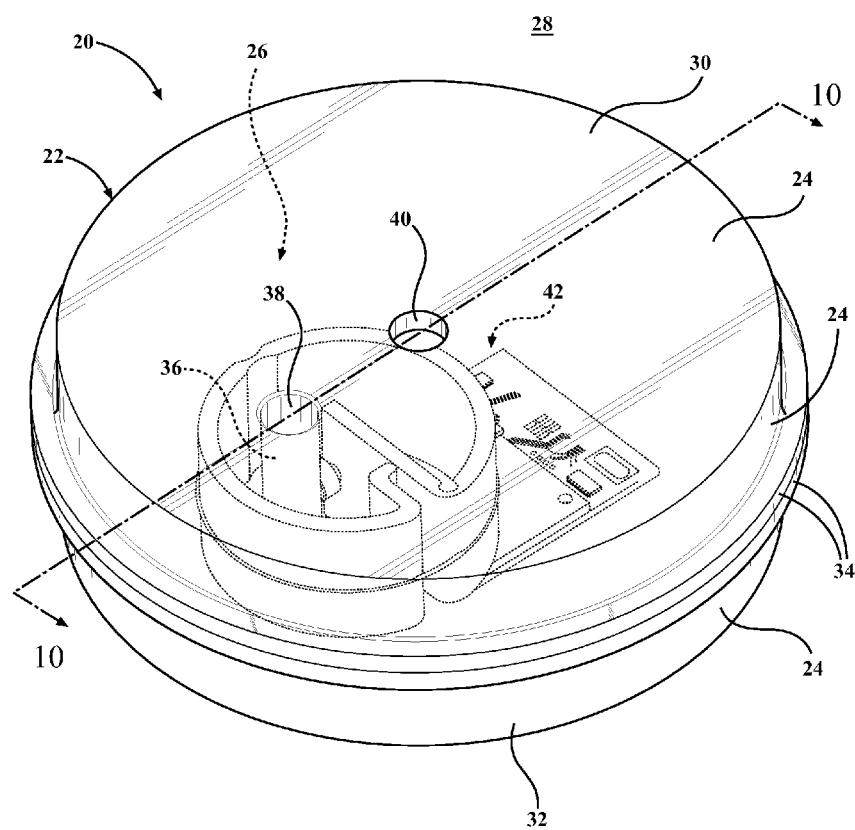
FIG. 1 is a perspective view of a fluid routing device showing a housing and a valve shown in phantom-line.
Figure 2:
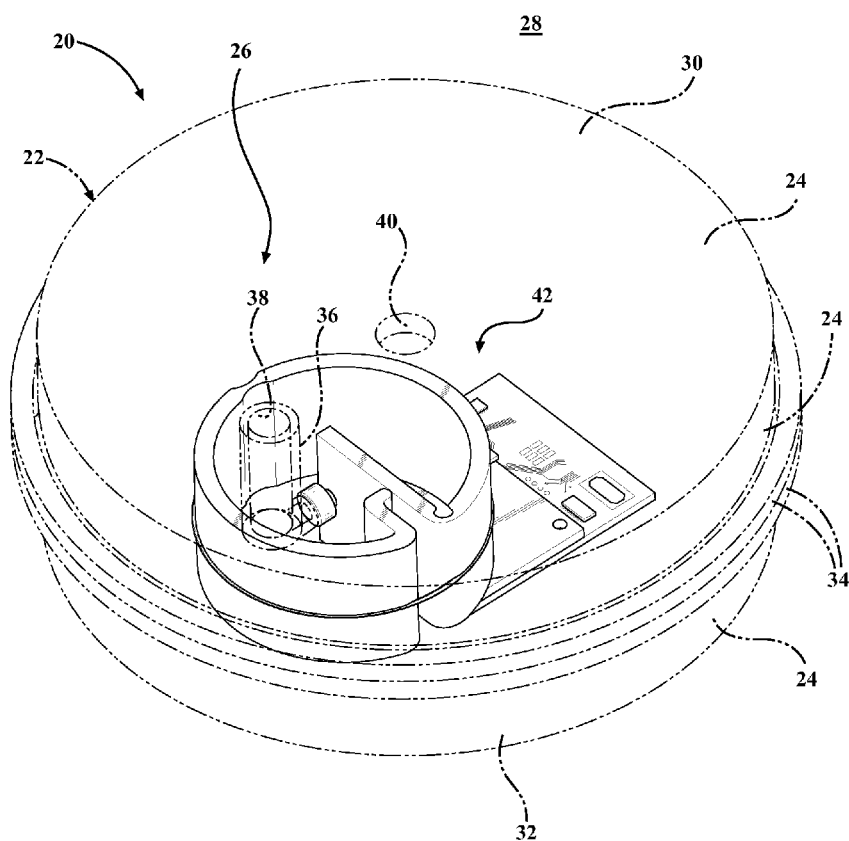
FIG. 2 is a perspective view of the fluid routing device showing the valve with the housing shown in phantom-line.

Referring to the Figures, wherein like numerals indicate like or corresponding parts throughout the several views, a fluid routing device 20 for directing the transportation of a fluid is generally shown in FIGS. 1 and 2. The fluid routing device 20 is typically used in a seat of a vehicle for transporting the fluid to support a user, such as to a plurality of bladders in a lumbar support system. It is to be appreciated that the fluid routing device 20 may be used in any configuration and in any context to direct the transportation of the fluid.

The fluid routing device 20 includes a housing 22 having a plurality of walls 24 defining an interior 26 and an exterior 28. The housing 22 may include a first section 30 and a second section 32 with each of the first and second sections 30, 32 having a flange 34. The flanges 34 abut one another and seal, further defining the interior 26 and the exterior 28.

As shown in FIGS. 1 and 2, the housing 22 may have a conical configuration. It is to be appreciated that the housing 22 may have a cuboidal configuration or any other suitable configuration for defining the interior 26 and the exterior 28.

The fluid routing device 20 includes a port 36 defining a passageway 38 between the interior 26 and the exterior 28 with the passageway 38 configured for allowing the fluid to flow therethrough. The port 36 may be mounted to the housing 22 and may extend into the interior 26 of the housing 22. More specifically, the port 36 may be mounted to the first section 30 of the housing 22. It is to be appreciated that the port 36 may be mounted to the second section 32 or any other portion of the housing 22.

The port 36 may be integral with the housing 22. Said differently, the port 36 may be formed during manufacturing with the housing 22. Furthermore, the port 36 may be integral with the first section 30 of the housing 22. It is to be appreciated that the port 36 may be coupled to the housing 22, by welding, mechanical fastener, or any other suitable manner of fastening.

The housing 22 may define a hole 40. More specifically, the first section 30 of the housing 22 may define the hole 40. The hole 40 is spaced from the port 36. It is to be appreciated that the second section 32, or any other portion of the housing 22, may define the hole 40.

Typically, the fluid routing device 20 directs the transportation of the fluid through tubes. For example, the tubes may be further defined as a pair of tubes with one of the pair of tubes coupled to the housing 22 of the fluid routing device 20 at the passageway 38 and another one of the pair of tubes coupled to the housing 22 at the hole 40. It is to be appreciated that the fluid routing device 20 may direct the transportation of the fluid by any suitable means, including without the use of the tubes.

Figure 3:
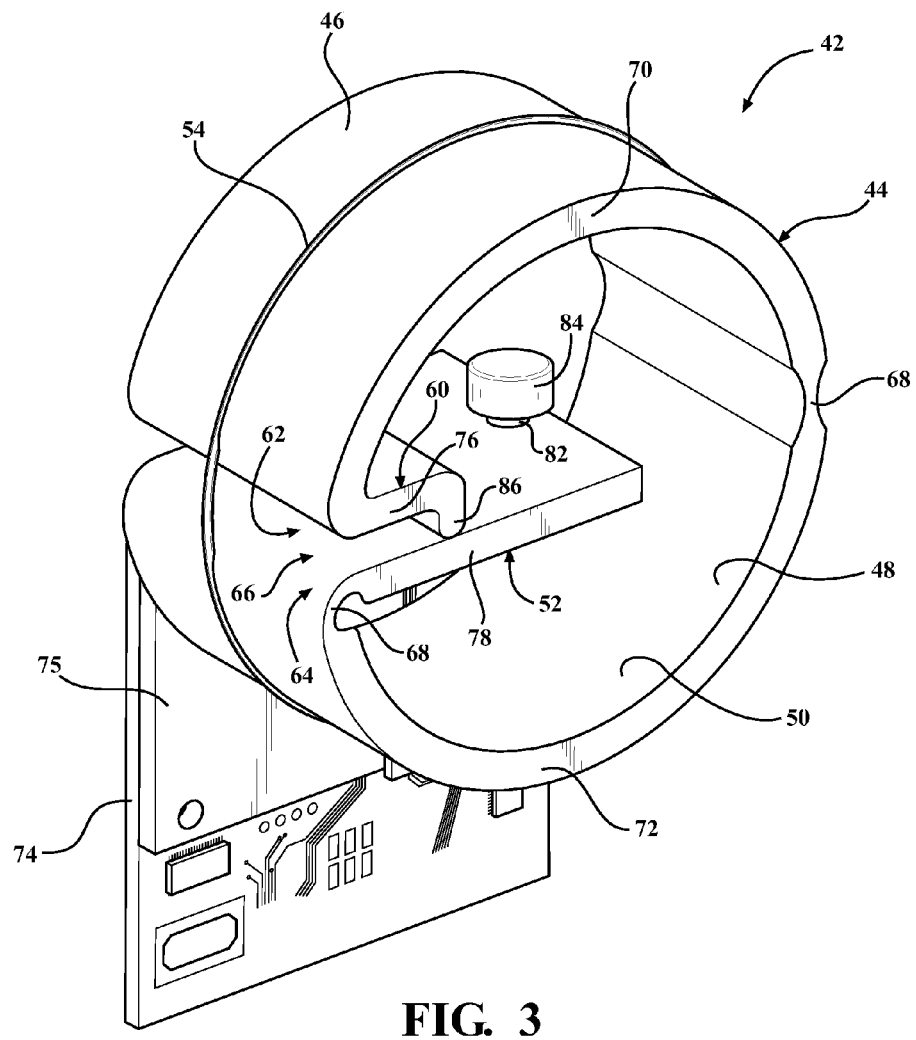
FIG. 3 is perspective view of the valve including a body, a sealing arm, a leg, and a board.
Figure 4:
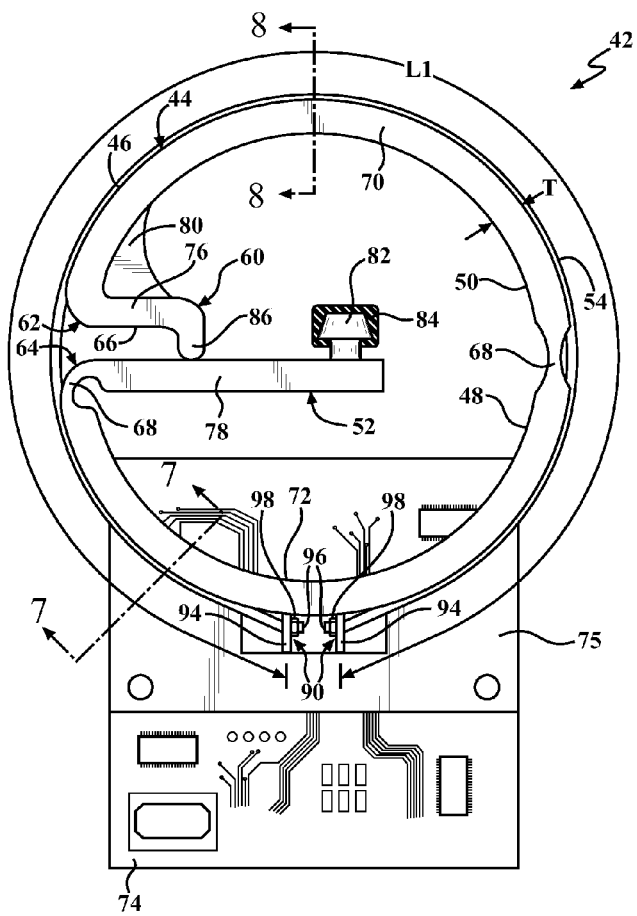
FIG. 4 is an elevational view of the valve with the body in an assembled-initial position, the sealing arm in a first position, and the leg in an initial position.
Figure 6:
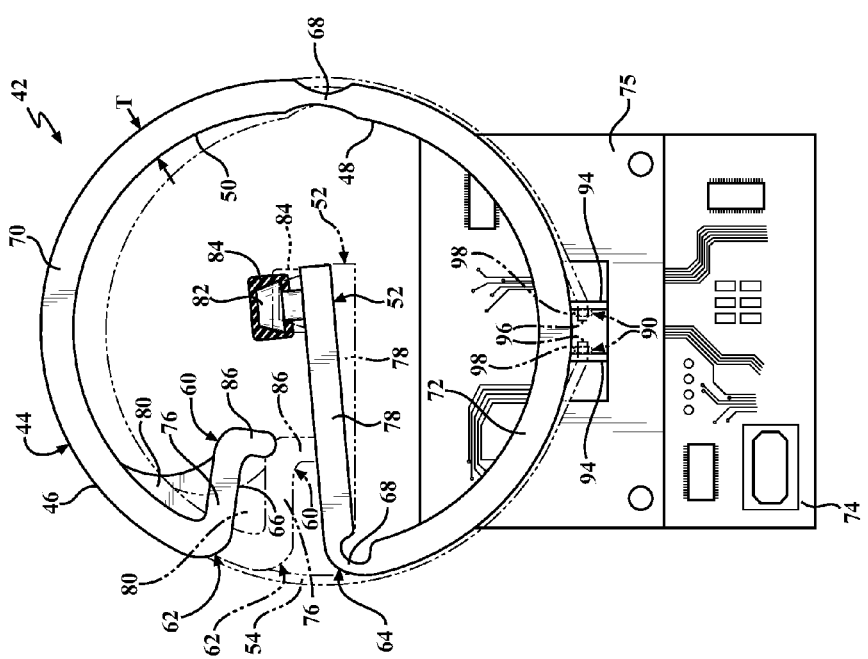
FIG. 6 is an elevational view of the valve showing each of the body in the assembled-deflected position, the sealing arm in a second position, and the leg in an activated position in solid-line and showing each of the body in the assembled-initial position, the sealing arm in the first position, and the leg in the initial position in phantom-line.

As shown in FIG. 3, the fluid routing device 20 includes a valve 42 disposed in the housing 22 and selectively opening and closing the passageway 38 defined by the port 36 to selectively permit the flow of the fluid therethrough. The valve 42 includes a body 44 defining an outer surface 46 and an inner surface 48 with the inner surface 48 defining an inner cavity 50. The valve 42 further includes a sealing arm 52 mounted to and extending from the body 44 into the inner cavity 50 and movable relative to the body 44 between a first position (as shown in FIG. 4) for closing the passageway 38 defined by the port 36, and a second position (as shown in FIG. 6) for opening the passageway 38 defined by the port 36. Furthermore, the valve 42 includes a shape memory alloy member 54 mounted to the body 44 and disposed at least partially along the outer surface 46. The shape memory alloy member 54 alternates between a first length L1 when the shape memory alloy member 54 is in a de-energized state (as shown in FIG. 4), and a second length L2 when the shape memory alloy member 54 is in an energized state (as shown in FIG. 6). The first length L1 is greater than the second length L2 such that the shape memory alloy member 54 constricts about the body 44 when the shape memory alloy member 54 is the second length L2.

The valve 42 includes a leg 60 mounted to and extending from the body 44 into the inner cavity 50. The leg 60 is moveable between an initial position (as shown in FIG. 4) when the shape memory alloy member 54 is in the de-energized state and an activated position (as shown in FIG. 6) when the shape memory alloy member 54 is in the energized state. The leg 60 correspondingly engages and moves the sealing arm 52 from the first position to the second position when the leg 60 moves from the initial position to the activated position for opening the passageway 38 defined by the port 36.

Figure 10:
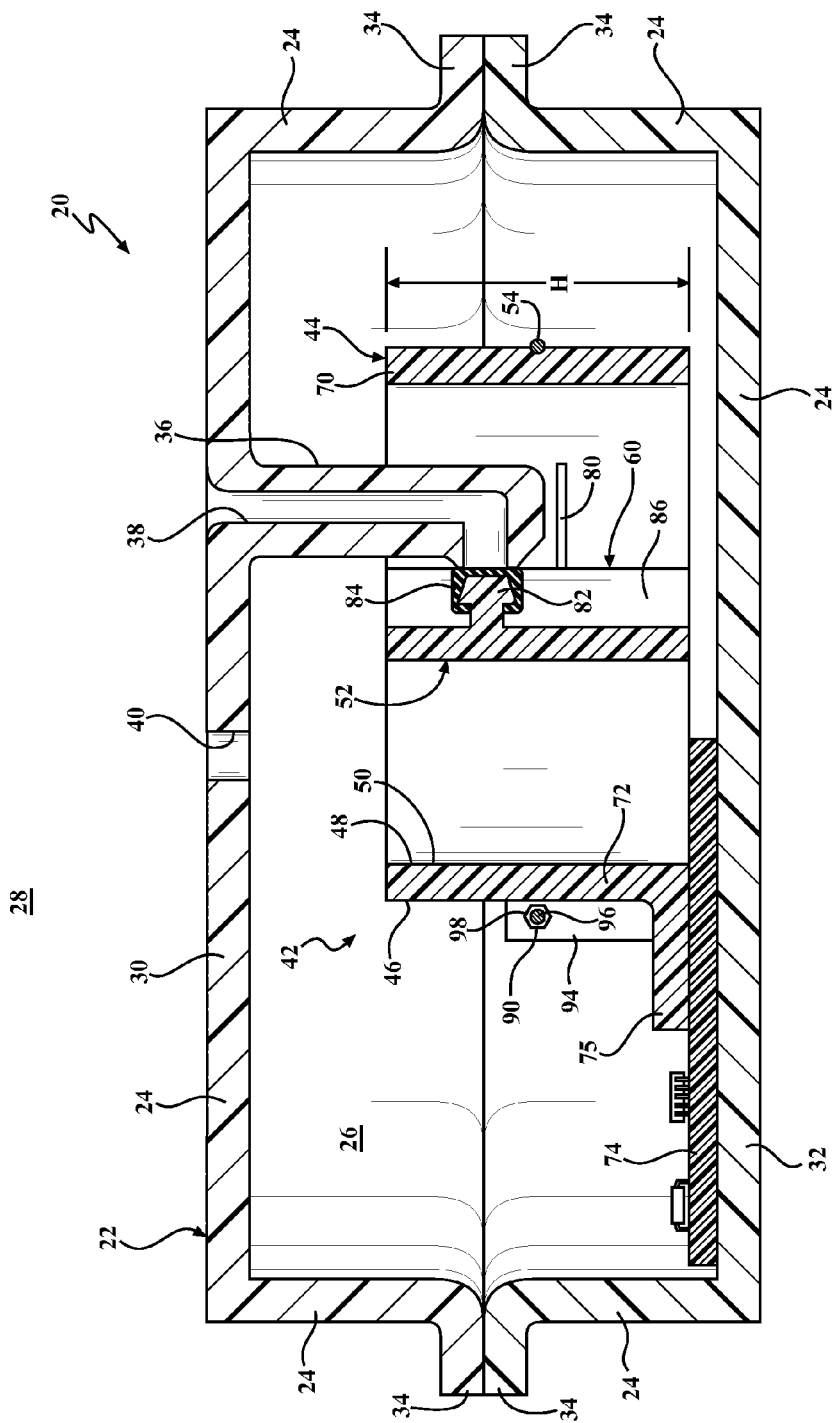
FIG. 10 is a cross-sectional view of the fluid routing device with the sealing arm of the valve in the first position taken along 10-10 shown in FIG. 1.
Figure 11:
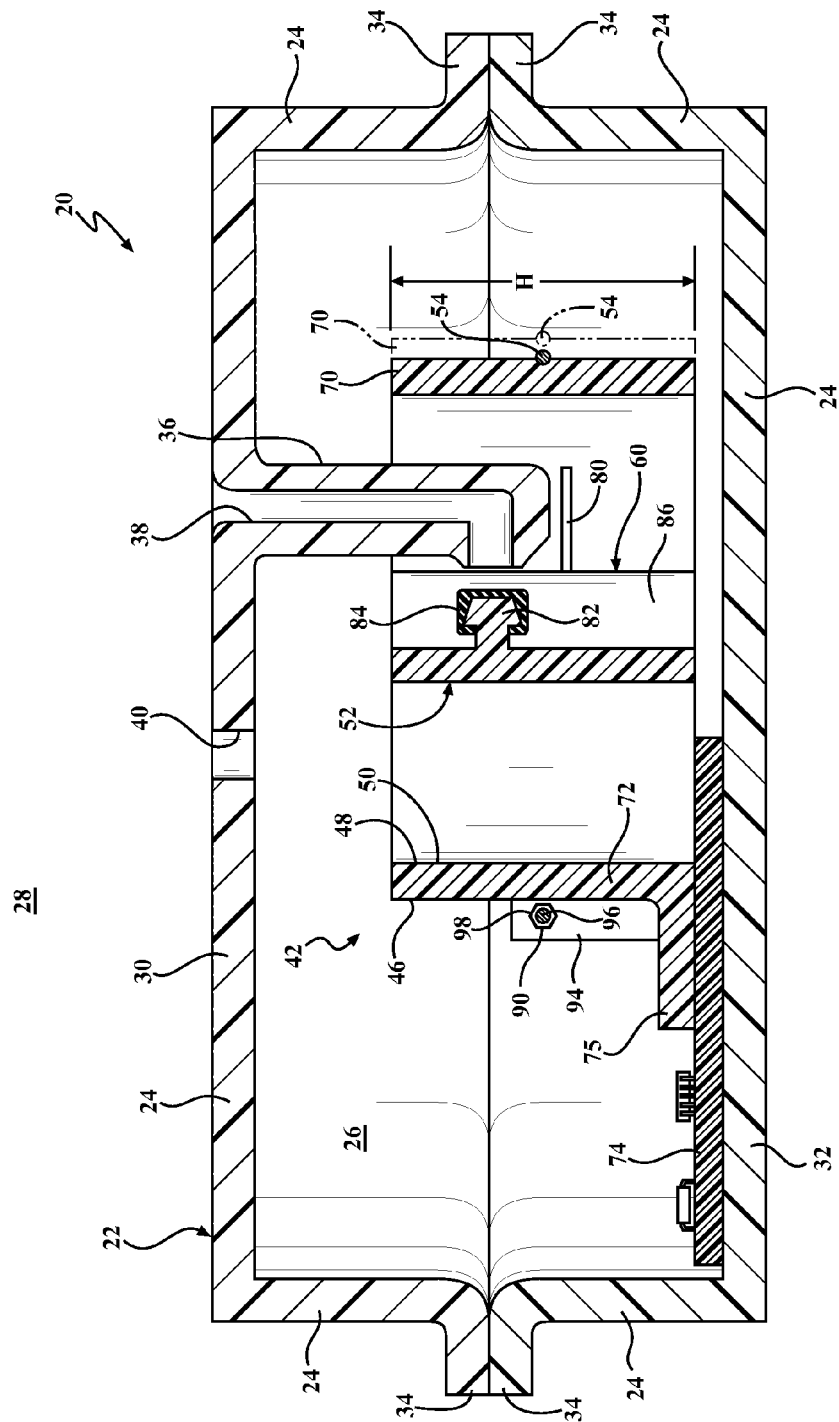
FIG. 11 is a cross-sectional view of the fluid routing device with the sealing arm of the valve in the second position.

As described above, the housing 22 may define the hole 40. The selective opening and closing of the passageway 38 of the port 36 selectively fluidly couples the passageway 38 and the hole 40 through the interior 26 for permitting flow of the fluid between the passageway 38 and the hole 40 through the interior 26. Said differently, when the leg 60 is in the activated position and the sealing arm 52 is in the open position as shown in FIG. 11, the fluid is permitted to flow between the passageway 38 and the hole 40 through the interior 26. When the leg 60 is in the initial position and the sealing arm 52 is in the closed position as shown in FIG. 10, the fluid is prevented from flowing through the passageway 38. Said differently, the fluid may flow between the exterior 28 and the interior 26 through the hole 40; however, the fluid is prevented from flowing between the exterior 28 and the interior 26 through the passageway 38. As such, the valve 42 prevents the flow of the fluid between the hole 40 and the passageway 38 when the sealing arm 52 is in the first position. On the other hand, the valve 42 fluidly couples the hole 40 and the passageway 38 when the sealing arm 52 is in the second position as shown in FIG. 11, allowing the fluid to flow between the hole 40 and the passageway 38.

As shown in FIGS. 1 and 2 and as described above, the port 36 may be mounted to the housing 22 and extend into the interior 26 of the housing 22. Furthermore, the port 36 may extend into the inner cavity 50 of the body 44 of the valve 42 to facilitate alignment of the passageway 38 with the sealing arm 52 and selective opening and closing of the passageway 38 with the sealing arm 52. Said differently, the port 36 may extend into the inner cavity 50 without engaging the body 44. As described above, usually the port 36 is mounted to the first section 30 and extends transverse to the flange 34 such that the port 36 extends substantially perpendicular from the first section 30. Furthermore, the port 36 usually has a substantially cylindrical configuration with the port 36 defining the passageway 38 having an "L" shape configuration. The benefit of the port 36 having the substantially cylindrical configuration and the passageway 38 having the "L" shape configuration will be better understood through further description below. It is to be appreciated that the port 36 and the passageway 38 may have any suitable configuration for allowing the fluid to flow through the passageway 38.

As shown in FIG. 4, the body 44 may have a first end 62 and a second end 64 spaced from the first end 62 with one of the first and second ends 62, 64 movable relative to another one of the first and second ends 62, 64 with the alternating of the shape member alloy member between the first and second lengths L1, L2. Said differently, body 44 may deflect as the shape memory alloy member 54 constricts about the body 44 from the first length L1 to the second length L2. Furthermore, the body 44 may have an internal bias that resists the constriction of the shape memory alloy member 54. For example, as shown with solid lines in FIG. 5, the body 44 may have a pre-assembly position prior to the disposition of the shape memory alloy member 54 at least partially along the outer surface 46 of the body 44. As shown with solid lines in FIG. 4 and phantom lines in FIGS. 5 and 6 and XX, the body 44 may have an assembled-initial position with the shape memory alloy member 54 at least partially along the outer surface 46 of the body 44 and said first length L1. As shown with solid lines in FIG. 6, the body 44 may have an assembled-deflected position with the shape memory alloy member 54 at least partially along the outer surface 46 of the body 44 and said first length L1.

The body 44 in the pre-assembly position is more expanded than the body 44 in the assembled-initial position, which shows that the body 44 is biased toward the expanded pre-assembly position. Therefore, any deflection of the body 44 will be against the internal bias of the body 44 such that removal of a force deflecting the body 44 will cause the body 44 to return to the pre-assembly position. Furthermore, the body 44 in the assembled-initial position is more expanded than the body 44 in the assembled-deflected position. Therefore, any deflection of the body 44 will be against the internal bias of the body 44 such that removal of the force deflecting the body 44 to the assembled-deflected position will cause the body 44 to return toward the pre-assembly position. As such, as the shape memory increases in length from the second length L2 to the first length L1, the internal bias of the body 44 facilitates the movement of the body 44 from the assembled-deflected position to the assembled-initial position.

The movement of the one of the first and second ends 62, 64 moves the leg 60 between the initial and activated positions and moves the sealing arm 52 between the first and second positions. More specifically, the first end 62 may be movable relative to the second end 64 to move the leg 60 from the initial position to the activated position and the sealing arm 52 from the first position to the second position. As will be described in greater detail below, the second end 64 of the body 44 is fixed relative to the housing 22. With the second end 64 of the body 44 fixed, the first end 62 of the body 44 may move between the assembled-initial position (shown in FIG. 4) and the assembled-deflected position (shown in FIG. 6) as the shape memory alloy member 54 alternates between the first length L1 and the second length L2, respectively. Furthermore, when the body 44 is in the assembled-initial position, the leg 60 is in the initial position. When the body 44 is in the assembled-deflected position, the leg 60 is in the activated position. It is to be appreciated that the first end 62 may move relative to the first end 62. Furthermore, it is to be appreciated that both the first and second ends 62, 64 may be movable. The corresponding movement of the leg 60 with the movement of the first end 62 will be better understood through further description below.

As described above, the second end 64 may be spaced from the first end 62. Furthermore, the first and second ends 62, 64 may be oriented such that the first and second ends 62, 64 substantially face each other with the one of the first and second ends 62, 64 movable toward and away from the other one of the first and second ends 62, 64. More specifically, as described above and shown in FIG. 4, the first and second ends 62, 64 substantially face each other with the first end 62 movable toward and away from the second end 64. It is to be appreciated that the first and second ends 62, 64 may be positioned in any orientation spaced from each other.

Additionally, the body 44 may have an arcuate configuration between the first and second ends 62, 64. More specifically, as shown in FIG. 4, with the body 44 in the arcuate configuration, the first and second ends 62, 64 substantially face each other. Furthermore, the arcuate configuration is typically a substantially circular configuration. It is to be appreciated that the body 44 may have a rectangular configuration or any other suitable configuration between the first and second ends 62, 64.

In addition, the body 44 has a height H which is substantially consistent between the first and second ends 62, 64, as shown in FIGS. 10 and 11. As such, when the body 44 has the substantially circular configuration, the body 44 may be further described as a substantially tubular configuration.

As shown in FIGS. 3 and 4, with the first and second ends 62, 64 spaced from and substantially facing each other and with the body 44 having the arcuate configuration, the body 44 defines a gap 66 between the first and second ends 62, 64. Said differently, the gap 66 prevents the body 44 from having a completely enclosed configuration (i.e., a completely circular configuration or any other suitable configuration that does not define the gap 66). It is to be appreciated that the body 44 may have material between the first and second ends 62, 64, filling the gap 66 such that the body 44 has a completely enclosed configuration. Furthermore, it is to be appreciated that in the completely enclosed configuration the first and second ends 62, 64 may still be defined with the second end 64 spaced from the first end 62. Said differently, each of the characteristics applied above to the body 44 having the first and second ends 62, 64 may be applied to the body 44 having the completely enclosed configuration.

Figure 5:
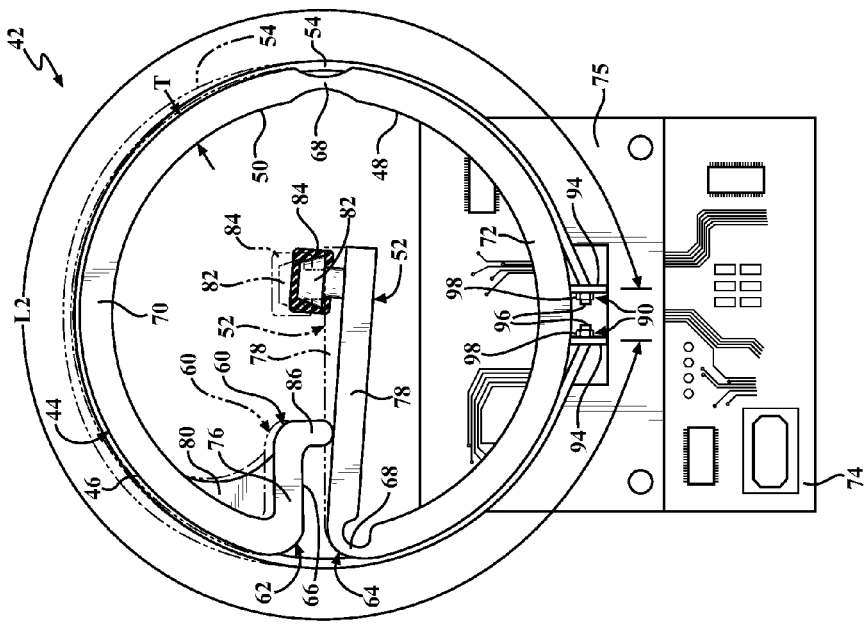
FIG. 5 is an elevational view of the valve showing the body in a pre-assembly position in solid-line and showing each of the body in the assembled-initial position, the sealing arm in the first position, and the leg in the initial position in phantom-line.

The body 44 may have at least one living hinge 68 along the body 44 to facilitate deflection of at least one of the body 44, the sealing arm 52, and the leg 60, and corresponding movement of the sealing arm 52 from the first position to the second position. As shown in FIGS. 4-6, the body 44 has a thickness T which is generally consistent between the first and second ends 62, 64. The at least one living hinge 68 is usually a reduction in the generally consistent thickness T between the first and second ends 62, 64 which facilitates controlled deflection at the living hinge 68. Alternatively, the living hinge 68 may be a result of a change in material along the body 44 having a lower rigidity than the rest of the body 44. Furthermore, the living hinge 68 may be a mechanical hinge positioned along the body 44 between the first and second ends 62, 64. It is to be appreciated that the living hinge 68 may be any configuration which facilitates deflection of the body 44 at the living hinge 68.

The at least one living hinge 68 may be between the first and second ends 62, 64 to facilitate deflection of the body 44. Furthermore, the at least one living hinge 68 may be positioned at at least one of the first and second ends 62, 64 to facilitate deflection of the sealing arm 52. For example, the leg 60 may extend from the body 44 at the first end 62 and the sealing arm 52 may extend from the body 44 at the second end 64 with the at least one living hinge 68 positioned at the second end 64 and with the movement of the sealing arm 52 further defined as pivoting of the sealing arm 52 relative to the body 44 between the first and second positions about the at least one living hinge 68.

The at least one living hinge 68 may be a pair of living hinges 68 with one of the pair of living hinges 68 positioned at the second end 64 as described above and another one of the pair of living hinges 68 positioned along the body 44 approximately half-way between the first and second ends 62, 64, with the body 44 defining a first portion 70 adjacent the first end 62 and a second portion 72 adjacent the second end 64. The purpose of the pair of living hinges 68 will be better understood through further description below. It is to be appreciated that the at least one living hinge 68 may be any number of living hinges 68. Furthermore, it is to be appreciated that the body 44 may have no living hinges 68. Even further, it is to be appreciated that the body 44 may be rigid and incapable of deflecting.

The valve 42 may further include a board 74 coupled to the housing 22 with the body 44 of the valve 42 mounted to the board 74 to couple the body 44 to the housing 22 and position the sealing arm 52 to selectively open and close the passageway 38 of the port 36. More specifically, a portion of the body 44 may be mounted to the board 74. As shown in FIGS. 10 and 11, the board 74 is positioned under a portion of the body 44. More specifically, the board 74 is positioned under the second portion 72 of the body 44. The valve may include a lip 75 which is typically positioned between second portion 72 of the body 44 and the board 74 and extending substantially parallel to the board 74. Usually, the lip 75 is integral with the body 44 such that the lip 75 and the body 44 are formed of the same material. It is to be appreciated that the lip 75 and the body 44 may be coupled to one another by mechanical means, chemical means, or any other suitable means. The lip 75 is mounted to the board 74. As such the second portion 72 of the body 44 is mounted to the board 74 such that the first portion 70 of the body 44 may move about the living hinge 68 while the mounting to the second portion 72 to the board 74, which is coupled to the housing 22, retains the position of the valve 42 within the housing 22. It is to be appreciated that the first portion 70 of the body 44 may be mounted to the board 74. Furthermore, it is to be appreciated that the any portion or combination of portions of the body 44 may be mounted to the board 74. Typically, the lip 75 is mounted to the board 74 by heat-staking a plurality of posts of the board 74 which extend through a plurality of holes defined by the lip 75. Alternatively, the lip 75 may be mounted to the board 74 by riveting, a press-fit connection, or a push-fit split pin connection. It is to be appreciated that the body 44 may be directly mounted to the board 74 by any manner of attachment including those described above and those not explicitly described herein.

The board 74 is typically coupled to the second section 32 of the housing 22 with the body 44 between the board 74 and the first section 30 of the housing 22. The port 36 extends from the first section 30 of the housing 22 into the cavity opposite the board 74. It is to be appreciated that the board 74 may be coupled to the first section 30 or any portion of the housing 22. Typically, the board 74 is coupled to the housing 22 by heat-staking a plurality of posts of the housing 22 which extend through a plurality of holes defined by the board 74. Alternatively, the board 74 may be mounted to the housing 22 by riveting, a press-fit connection, or a push-fit split pin connection. It is to be appreciated that the board 74 may be directly mounted to the housing 22 by any manner of attachment including those described above and those not explicitly described herein.

As described above and shown in FIG. 4, the leg 60 may extend from the body 44 at the first end 62 and the sealing arm 52 may extend from the body 44 at the second end 64. The leg 60 and the sealing arm 52 may extend into the inner cavity 50 in substantially the same direction. It is to be appreciated that the leg 60 may extend from the body 44 at the second end 64 and the sealing arm 52 may extend from the body 44 at the first end 62. It is also to be appreciated that the leg 60 and the sealing arm 52 may extend into the inner cavity 50 in opposing directions or in any other suitable direction. Furthermore, the leg 60 may have an extension portion 76 and the sealing arm 52 may have an engagement portion 78 with the extension portion 76 and the engagement portion 78 substantially parallel to one another.

The valve 42 may include a rib 80 mounted to each of the first portion 70 of the body 44 and the engagement portion 78 of the sealing arm 52 proximate the second end 64 of the body 44. The rib 80 reinforces the position of the leg 60 relative to the first portion 70 of the body 44 to reduce deflection of the leg 60 relative to the body 44 at the first end 62. As such, the rib 80 facilitates the leg 60 engaging and moving the sealing arm 52 from the first position to the second position when the leg 60 moves from the initial position to the activated position while reducing deflection of the leg 60 away from the sealing arm 52.

The sealing arm 52 may have the engagement portion 78 and a sealing tip 82. The sealing tip 82 may be transverse to the engagement portion 78 for selectively opening and closing the passageway 38 defined by the port 36. Usually, the tip extends perpendicular to the engagement portion 78 such that sealing tip 82 selectively engages the port 36 to selectively open and close the passageway 38. As described above and shown in FIG. 10, the port 36 has the substantially cylindrical configuration and the passageway 38 has the "L" shape configuration. The cylindrical configuration facilitates the extension of the port 36 into the inner cavity 50. The "L" shape configuration of the passageway 38 facilitates the extension and positioning of the passageway 38 into the inner cavity 50, with a portion of the defined passageway 38 substantially parallel to the sealing tip 82, facilitating the selective opening and closing the passageway 38 by the sealing tip 82 of the sealing arm 52.

Typically, the body 44, the leg 60, and the sealing arm 52 are comprised of a copolymer material such as polyoxymethylene (POM), commonly referred to as acetal. Alternatively, the body 44, the leg 60, and the sealing arm 52 may be comprised of nylon or any suitable engineering thermoplastic. It is to be appreciated that the body 44, the leg 60, and the sealing arm 52 may be comprised of any suitable material.

As shown in FIG. 4, the valve 42 may further include a sealing member 84 coupled to the sealing tip 82 with the sealing member 84 compressible for sealing against the port 36 and closing the passageway 38. Said differently, when present, the sealing member 84 is positioned between the sealing tip 82 and the port 36 with the sealing member 84 engaging both the sealing tip 82 and the port 36 when the sealing arm 52 is in the first position. The sealing member 84 is usually made of an elastomeric material such as ethylene propylene diene monomer (EPDM) rubber or silicone rubber. It is to be appreciated that the sealing member 84 may be made of any suitable material for sealing against the port 36.

The leg 60 engages and moves the sealing arm 52. More specifically, the leg 60 may engage the engagement portion 78 between the body 44 and the sealing tip 82 to move the sealing arm 52 from the first position to the second position. Furthermore, the leg 60 may have an abutment portion 86 transverse to the extension portion 76 with the abutment portion 86 engaging the engagement portion 78 of the sealing arm 52 and moving the sealing arm 52 from the first position when the leg 60 is in the initial position to the second position when the leg 60 is in the activated position. Furthermore, the abutment portion 86 may be transverse to the engagement portion 78 of the sealing portion. As such, the abutment portion 86 exerts a transverse force on the engagement portion 78 as the leg 60 moves from the initial position to the activated position.

The abutment portion 86 of the leg 60 typically engages the engagement portion 78 of the sealing arm 52 spaced from the second end 64 of the body 44. The engagement of the abutment portion 86 with the engagement portion 78 spaced from the second end 64 of the body 44 creates a moment force about the living hinge 68. The moment force is equal to the transverse force exerted by the abutment portion 86 of the leg 60 multiplied by the distance of the spacing between the second end 64 and the abutment portion 86. The greater the spacing, the more moment force about the living hinge 68. As such, the transverse force required to create the moment force that is constant anywhere along the engagement portion 78 decreases the greater the spacing is between the second end 64 and the abutment portion 86.

As shown in FIG. 4, the engagement portion 78 of the sealing arm 52 is usually half-way along the engagement portion 78 between the second end 64 of the body 44 and the sealing tip 82. It is to be appreciated that the abutment portion 86 or any other portion of the leg 60 may engage the sealing arm 52 anywhere along the engagement portion 78 or any other portion of the sealing arm 52.

Figure 9:
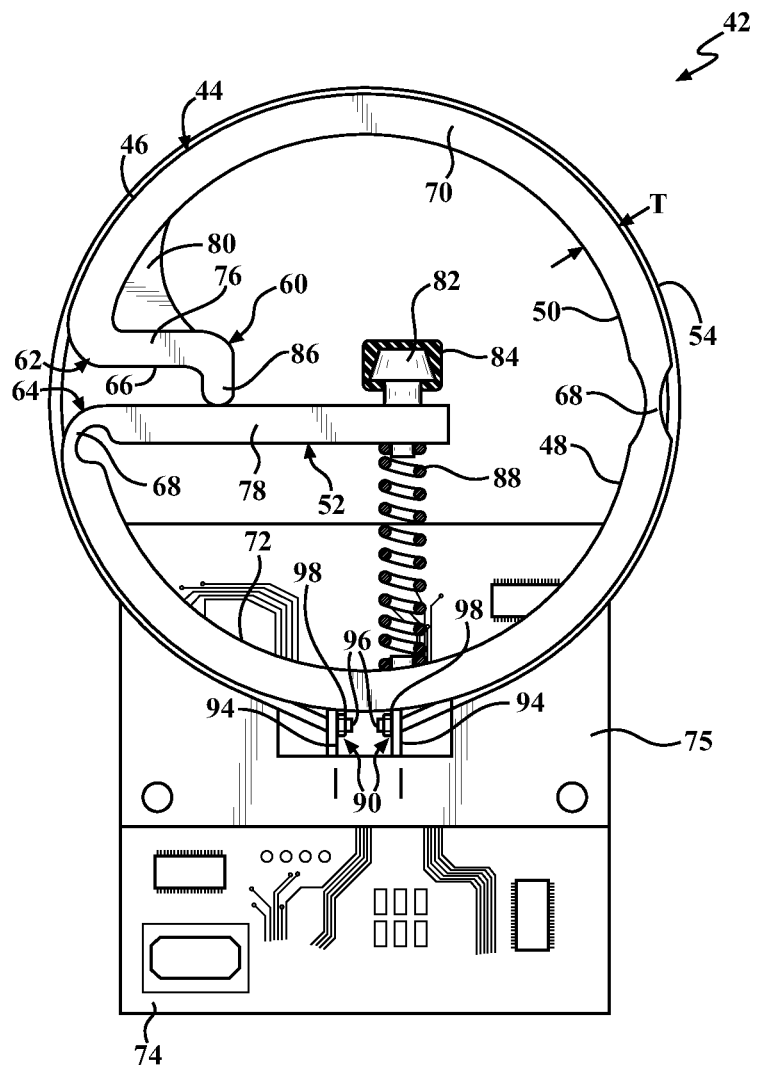
FIG. 9 is an elevational view of the valve including a biasing member.

As shown in FIG. 9, the valve 42 may further include a biasing member 88 coupled to the sealing arm 52 for biasing the sealing arm 52 toward the first position for closing the passageway 38 of the port 36 when the shape memory alloy member 54 is the first length L1. More specifically, the biasing member 88 is usually positioned within the inner cavity 50 and is coupled to each of the sealing arm 52 and the lip 75. Even more specifically, the biasing member 88 is usually coupled to each of the engagement portion 78 of the sealing arm 52 and a stud which extends from the lip 75. As such, the biasing member 88 biases the sealing arm 52 away from the lip 75 toward the first position. Said differently, the biasing member 88 is in compression between the engagement portion 78 and the stud of the lip 75. The biasing member 88 assists the internal bias within the sealing arm 52 and/or the body 44 (and when present, the living hinge 68) which biases the sealing arm 52 toward the first position.

It is to be appreciated that the biasing member 88 may be coupled to the sealing arm 52 and to any component of the fluid routing device 20 to bias the sealing arm 52 toward the first position. Furthermore, as described above the biasing member 88 is usually in compression. It is to be appreciated that the biasing member 88 may be in tension, torsion, deflection, or any other suitable spring-state which biases the sealing arm 52 toward the first position.

As described above and shown in FIG. 4, the shape memory alloy member 54 is mounted to the body 44 and disposed at least partially along the outer surface 46. More specifically, the shape memory alloy member 54 may extend between a pair of ends 90. Furthermore, the shape memory alloy member 54 may be disposed along a majority of the outer surface 46 such that the shape memory alloy member 54 substantially encircles the body 44. For example, the pair of ends 90 is positioned along the outer surface 46 of the second portion 72 of the body 44 substantially adjacent to one another such that the shape memory alloy member 54 encircles the body 44. It is to be appreciated that the shape memory alloy member 54 may be disposed along any of the outer surface 46 of the body 44 which facilitates the shape memory alloy member 54 constricting about the body 44.

Figure 7:
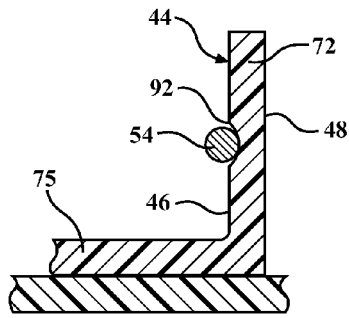
FIG. 7 is a cross-sectional view of the board and the body taken along 7-7 shown in FIG. 4.
Figure 8:
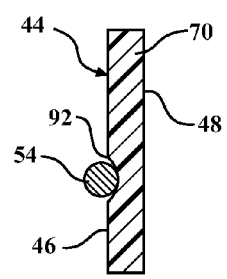
FIG. 8 is a cross-sectional view of the board and the body taken along 8-8 shown in FIG. 4.

The outer surface 46 of the body 44 may define a channel 92 as shown in FIGS. 7 and 8. The shape memory alloy member 54 is received within the channel 92 to retain the disposition of the shape memory alloy member 54 at least partially along the outer surface 46 of the body 44 and mount the shape memory alloy member 54 to the body 44. Typically, the channel 92 is defined by the outer surface 46 with the channel 92 extending longitudinally between the first and second ends 62, 64. It is to be appreciated that the channel 92 may be defined by the outer surface 46 anywhere along the body 44.

As described above and shown in FIG. 4, the valve 42 may further include the board 74. The board 74 may have a conductivity to an electrical current. The shape memory alloy member 54 may be coupled to the board 74 with the board 74 selectively transmitting the electrical current to the shape memory alloy member 54 to alternate the shape memory alloy member 54 between the energized and de-energized states. More specifically, each of the pair of ends 90 of the shape memory alloy member 54 may be coupled to the board 74 with the board 74 selectively transmitting the electrical current through the shape memory alloy member 54 between the pair of ends 90. For example, the board 74 may have a pair of terminals 94 with one of the pair of ends 90 of the shape memory alloy member 54 coupled to one of the pair of terminals 94 and with another one of the pair of ends 90 of the shape memory alloy member 54 coupled to another one of the pair of terminals 94. Each of the pair of ends 90 may be coupled to the pair of terminals 94 by a threaded shaft 96 and a nut 98. It is to be appreciated that the pair of ends 90 may be coupled to the pair of terminals 94 by any suitable means, including, but not limited to, crimping and soldering.

When the electrical current is transmitted by the board 74 through the shape memory alloy member 54 between the pair of ends 90, the shape memory alloy member 54 is in the energized state as shown in FIG. 6. On the other hand, when the electrical current is not transmitted by the board 74 through the shape memory alloy member 54 between the pair of ends 90, the shape memory alloy member 54 is in the de-energized state, as shown in FIG. 4.

When the shape memory alloy member 54 is in the de-energized state and is the first length L1 as shown in FIG. 4, the shape memory alloy member 54 is in a martensite phase. When the shape memory alloy member 54 is in the energized state and is the second length L2 as shown in FIG. 6, the shape memory alloy member 54 is in an austenite phase. The shape memory alloy member 54 in the austenite phase is shorter than the shape memory alloy member 54 in the martensite phase. When the electrical current is applied to the shape memory alloy member 54 (i.e., the shape memory alloy member 54 goes from the de-energized state to the energized state) the shape memory alloy member 54 undergoes a phase change from the martensite phase to the austenite phase. When the electrical current is removed from the shape memory alloy member 54 (i.e., the shape memory alloy member 54 goes from the energized state to the de-energized state) the shape memory alloy member 54 undergoes a phase change from the austenite phase to the martensite phase.

The operation of the fluid routing device 20 will be discussed below for illustrative purposes only. Specifically, the operation of opening the passageway 38 defined by the port 36 will be discussed first below, followed by the operation of closing the passageway 38 defined by the port 36 will be discussed first below.

The passageway 38 of the port 36 is normally closed by the valve 42, as shown in FIG. 10. Said differently, when the shape memory alloy member 54 is in the de-energized state, the internal bias of at least one of the sealing arm 52 and the body 44 (and when present, the biasing member 88) biases the sealing arm 52 toward the port 36. The sealing arm 52 engages the port 36 and closes the passageway 38. More specifically, when present, the sealing member 84 disposed on the sealing tip 82 engages the port 36 and closes the passageway 38. The shape memory alloy member 54 has the first length L1, as shown in FIG. 4.

To open the passageway 38, the shape memory alloy member 54 enters the energized state. The shape memory alloy member 54 reduces in length from the first length L1 (as shown in FIG. 4) to the second length L2 (as shown in FIG. 6). The reduction in length to the second length L2 causes the shape memory alloy member 54 to constrict about the body 44. Typically, the constriction of the shape memory alloy member 54 causes the body 44 to deflect from the assembled-initial position to the assembled-deflected position. When the living hinge(s) 68 is/are present, the constriction causes the body 44 to deflect at the living hinge(s) 68.

The constriction of the shape memory alloy member 54 about the body 44 causes the leg 60 to move from the initial position to the activated position. Typically, the deflection of the body 44 causes the leg 60 to move from the initial position to the activated position. The leg 60 engages the sealing arm 52. The leg 60 moves the sealing arm 52 from the first position to the second position when the leg 60 moves from the initial position to the activated position. When the living hinge 68 is present at the first end 62 of the body 44, the movement of the sealing arm 52 is further defined as pivoting of the sealing arm 52 about the living hinge 68 from the first position to the second position.

With the shape memory alloy member 54 in the energized state and the second length L2, with the leg 60 in the activated position, and with the sealing arm 52 in the second position, the passageway 38 of the port 36 is open (as shown in FIG. 11) and the fluid may flow therethrough.

To close the passageway 38, the shape memory alloy member 54 enters the de-energized state. The shape memory alloy member 54 increases in length from the second length L2 (as shown in FIG. 6) to the first length L1 (as shown in FIG. 4). The increase in length to the first length L1 causes the shape memory alloy member 54 to loosen about the body 44. If the body 44 was deflected in the energized state, the internal bias of the body 44 causes the body 44 to move from the assembled-deflected position to the assembled-initial position. Typically, the constriction of the shape memory alloy member 54 causes the body 44 to deflect. When the living hinge(s) 68 is/are present, the constriction causes the body 44 to deflect at the living hinge(s) 68.

Furthermore, the internal bias of the at least one of the sealing arm 52 (and when present, the biasing member 88) biases the sealing arm 52 toward the port 36. The sealing arm 52 engages the port 36 and closes the passageway 38, as shown in FIG. 10. More specifically, when present the sealing member 84 disposed on the sealing tip 82 engages the port 36 and closes the passageway 38.

The invention has been described in an illustrative manner, and it is to be understood that the terminology which has been used is intended to be in the nature of words of description rather than of limitation. As is now apparent to those skilled in the art, many modifications and variations of the subject invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A valve for selectively opening and closing a passageway defined by a port and selectively permitting the flow of a fluid therethrough, said valve comprising:
   a body defining an outer surface and an inner surface with said inner surface defining an inner cavity;
   a sealing arm mounted to and extending from said body into said inner cavity and movable relative to said body between a first position for closing the passageway defined by the port, and a second position for opening the passageway defined by the port;
   a shape memory alloy member mounted to said body and disposed at least partially along said outer surface with said shape memory alloy member alternating between a first length when said shape memory alloy member is in a de-energized state, and a second length when said shape memory alloy member is in an energized state with said first length greater than said second length such that said shape memory alloy member constricts about said body when said shape memory alloy member is said second length; and
   a leg mounted to and extending from said body into said inner cavity and moveable between an initial position when said shape memory alloy member is in said de-energized state and an activated position when said shape memory alloy member is in said energized state, said leg correspondingly engaging and moving said sealing arm from said first position to said second position when said leg moves from said initial position to said activated position for opening the passageway defined by the port.

2. A valve as set forth in claim 1 wherein said leg extends from said body at a first end and said sealing arm extends from said body at a second end with said first end movable relative to said second end to move said leg from said initial position to said activated position and said sealing arm from said first position to said second position.

3. A valve as set forth in claim 1 further including a board having a conductivity to an electrical current with said shape memory alloy member coupled to said board and with said board selectively transmitting said electrical current to said shape memory alloy member to alternate said shape memory alloy member between said energized and de-energized states.

4. A valve as set forth in claim 1 further including a biasing member coupled to said sealing arm for biasing said sealing arm toward said first position for closing the passageway of the port when said shape memory alloy member is said first length.

5. A valve as set forth in claim 1 wherein said sealing arm has an engagement portion and a sealing tip with said leg engaging said engagement portion between said body and said sealing tip to move said sealing arm from said first position to said second position.

6. A valve as set forth in claim 5 further including a sealing member coupled to said sealing tip with said sealing member compressible for sealing against the port and closing the passageway.

7. A valve as set forth in claim 1 wherein said leg has an extension portion and said sealing arm has an engagement portion with said extension portion and said engagement portion substantially parallel to one another.

8. A valve as set forth in claim 7 wherein said leg has an abutment portion transverse to said extension portion with said abutment portion engaging said engagement portion of said sealing arm and moving said sealing arm from said first position when said leg is in said initial position to said second position when said leg is in said activated position.

9. A valve as set forth in claim 7 wherein said sealing arm has a sealing tip transverse to said engagement portion for selectively opening and closing the passageway defined by the port.

10. A valve as set forth in claim 1 wherein said body has a first end and a second end spaced from said first end with one of said first and second ends movable relative to another one of said first and second ends with said alternating of said shape member alloy member between said first and second lengths to move said leg between said initial and activated positions and move said sealing arm between said first and second positions.

11. A valve as set forth in claim 10 wherein said body has an arcuate configuration between said first and second ends.

12. A valve as set forth in claim 10 wherein said first and second ends are oriented such that said first and second ends substantially face each other with said one of said first and second ends movable toward and away from said other one of said first and second ends.

13. A valve as set forth in claim 12 wherein said leg extends from said body at said first end and said sealing arm extends from said body at said second end with said leg and said sealing arm extending into said inner cavity in substantially the same direction.

14. A valve as set forth in claim 1 wherein said body has at least one living hinge along said body to facilitate deflection of at least one of said body, said sealing arm, and said leg, and corresponding movement of said sealing arm from said first position to said second position.

15. A valve as set forth in claim 14 wherein said body has a first end and a second end spaced from said first end.

16. A valve as set forth in claim 15 wherein said at least one living hinge is between said first and second ends to facilitate deflection of said body.

17. A valve as set forth in claim 15 wherein said at least one living hinge is positioned at at least one of said first and second ends to facilitate deflection of said sealing arm.

18. A valve as set forth in claim 17 wherein said leg extends from said body at said first end and said sealing arm extends from said body at said second end with said at least one living hinge positioned at said second end and with said movement of said sealing arm further defined as pivoting of said sealing arm relative to said body between said first and second positions about said at least one living hinge.

19. A fluid routing device for directing the transportation of a fluid, said fluid routing device comprising:
- a housing having a plurality of walls defining an interior and an exterior;
- a port defining a passageway between said interior and said exterior with said passageway configured for allowing the fluid to flow therethrough; and
- a valve disposed in said housing and selectively opening and closing the passageway defined by the port to selectively permit the flow of the fluid therethrough, said valve comprising:
  - a body defining an outer surface and an inner surface with said inner surface defining an inner cavity;
  - a sealing arm mounted to and extending from said body into said inner cavity and movable relative to said body between a first position for closing the passageway defined by the port, and a second position for opening the passageway defined by the port;
  - a shape memory alloy member mounted to said body and disposed at least partially along said outer surface with said shape memory alloy member alternating between a first length when said shape memory alloy member is in a de-energized state, and a second length when said shape memory alloy member is in an energized state with said first length greater than said second length such that said shape memory alloy member constricts about said body when said shape memory alloy member is said second length; and
  - a leg mounted to and extending from said body into said inner cavity and moveable between an initial position when said shape memory alloy member is in said de-energized state and an activated position when said shape memory alloy member is in said energized state, said leg correspondingly engaging and moving said sealing arm from said first position to said second position when said leg moves from said initial position to said activated position for opening the passageway defined by the port.

20. A fluid routing device as set forth in claim 19 wherein said valve further includes a board coupled to said housing with said body of said valve mounted to said board to couple said body to said housing and position said sealing arm to selectively open and close said passageway of said port.

21. A fluid routing device as set forth in claim 19 wherein said housing defines a hole with said selective opening and closing of said passageway of said port selectively fluidly coupling the passageway and the hole through the interior for permitting flow of the fluid between the passageway and the hole through the interior.

22. A fluid routing device as set forth in claim 19 wherein said port is mounted to said housing and extends into said interior of said housing and said inner cavity of said body of said valve to facilitate alignment of said passageway with said sealing arm and selective opening and closing of said passageway with said sealing arm.

\* \* \* \* \*